June 24, 1947.    R. M. ELDER ET AL    2,422,660
AIRCRAFT SUPPORT FOR ROCKET PROJECTILES
Filed Sept 19, 1945
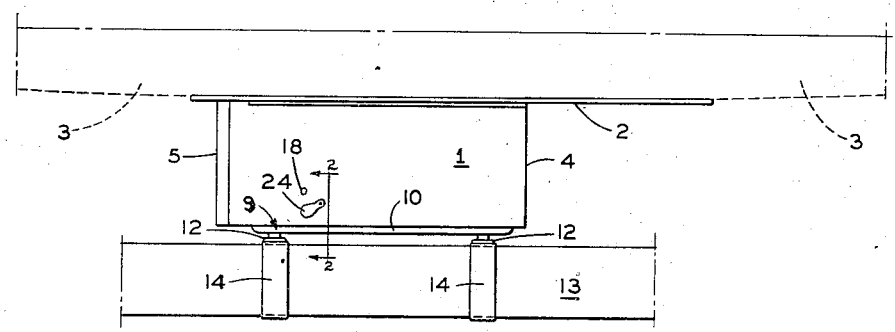
FIG. 1.
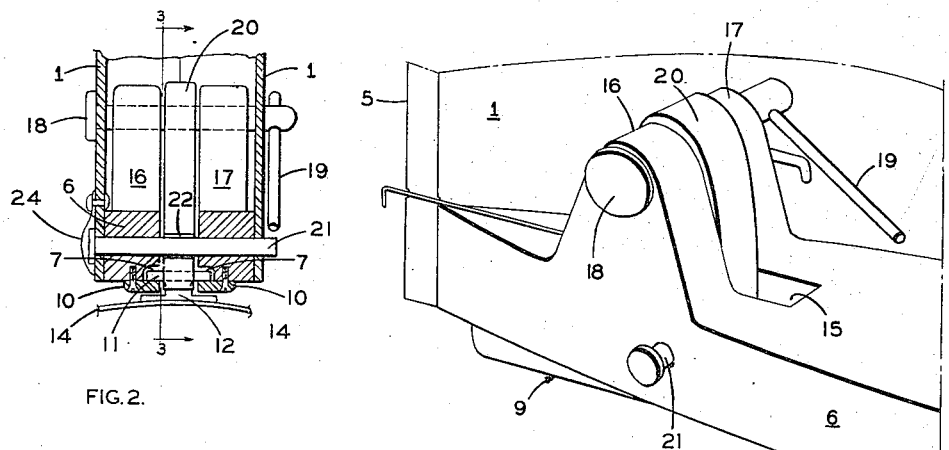
FIG. 2.
FIG. 4.
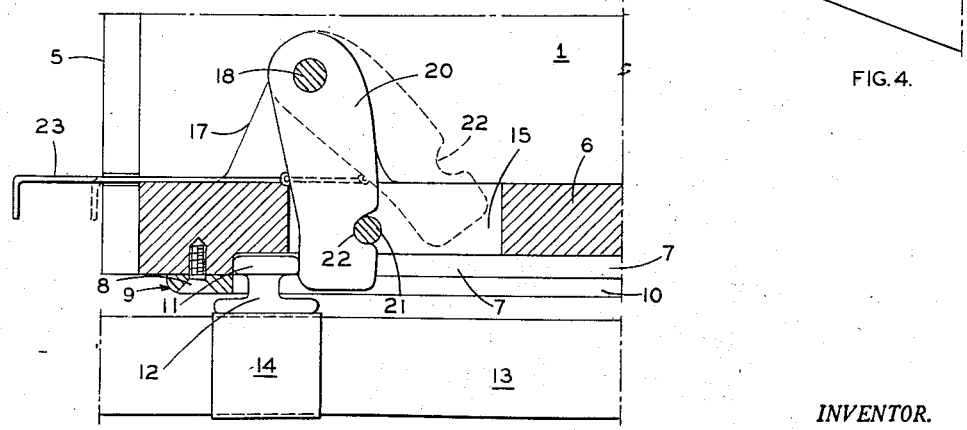
FIG. 3.
*INVENTOR.*
ROBERT M. ELDER.
JOHN J. DOMOJ.
EDWARD W. WISE.
JOHN J. KONIKOFF
BY Ralph L. Chappell
ATTORNEY.

Patented June 24, 1947

2,422,660

UNITED STATES PATENT OFFICE 2,422,660

AIRCRAFT SUPPORT FOR ROCKET
PROJECTILES

Robert M. Elder, John J. Domoj, and Edward W.
Wise, United States Navy, and John J. Konikoff,
United States Army, Philadelphia, Pa.

Application September 19, 1945, Serial No. 617,403

4 Claims. (Cl. 89—1.7)

(Granted under the act of March 3, 1883, as
amended April 30, 1928; 370 O. G. 757)

This invention relates to new and useful improvements in supports or mounts for rocket projectiles, and more particularly to supports or mounts for carrying rocket projectiles in firing position beneath the wings of aircraft.

It is a common practice at the present time for naval aircraft to carry at the under side of the wings offensive missiles of the rocket propelled type. In the case of carrier-based naval aircraft, considerable difficulty has been encountered in preventing dislodgement of the rocket projectiles from the planes when landing upon the flight deck of the carrier as the result of the concentrated deceleration forces imparted to the plane carrying such projectiles by the flight deck arresting gear employed to bring the planes to a stop as soon as they land on the flight deck.

With the foregoing in mind, it is the principal object of the present invention to provide a novel support or mount for rocket projectiles at the under side of the wings of naval aircraft which is constructed and operable to prevent release of the projectiles by the concentrated deceleration forces imparted to the plane during an arrested landing thereof upon the flight deck of an aircraft carrier.

Another object of the present invention is to provide a novel support or mount at the under side of the wings of an airplane which is operable to prevent release of a rocket projectile under normal operational forces imparted to the plane, but which is constructed and arranged so as not to interfere with the firing of the projectile as required or desired.

A further object of the present invention is to provide a support or mount for rocket projectiles having the features and characteristics set forth which is of relatively simplified and inexpensive construction, and entirely fool-proof and efficient in operation and use.

These and other objects of the invention and the various features and details of the construction and operation thereof, are hereinafter fully set forth and described with reference to the accompanying drawing, in which:

Fig. 1 is an elevational view of a support or mount for rocket projectiles made in accordance with the present invention and associated with the wing of an airplane.

Fig. 2 is an enlarged fragmentary section view taken on line 2—2, Fig. 1.

Fig. 3 is an enlarged sectional view taken on line 2—2, Fig. 2, and

Fig. 4 is a perspective view of the structure shown in Figs. 2 and 3.

Referring now to the drawing, a support or mount for rocket projectiles made in accordance with the present invention comprises a casing 1 which may have its upper end suitably secured to a plate or the like 2 which in turn is suitably located and fastened to the under side of the wing 3 of an airplane. The casing 1 preferably is streamlined to minimize resistance thereof to airflow by providing the same with a rounded leading edge 4 from which the walls of the casing 1 taper rearwardly to a trailing edge 5.

Secured in the lower end of the casing 1 is a support member 6 which is shaped to conform to the configuration of the casing 1. As shown in Fig. 2 the under or lower surface of the support member 6 has formed therein a longitudinally extending channel or groove 7 which is open at its forward end and closed at its rearward end. Secured by screws or the like 8 to the under side of the support member 6 is an elongated narrow U-shaped element 9 comprising parallel arm portions 10 which are arranged to underlie and project inwardly along the lateral edge portions of the groove or channel 7 throughout the length thereof to provide, in effect, an undercut channel arrangement adapted to slidably receive and retain therein the enlarged head portions 11 of button-like devices 12 from which a rocket projectile 13 may be supported, for example, by suitable straps or the like 14 in the manner and relation shown in Figs. 1, 2 and 3 of the drawing. As there shown, head 11 of the rearward one of said buttons 12 is positioned at the extreme inward limit of the groove or channel 7 (see Fig. 3) and the forward button device 12 is positioned in said channel 7 just inwardly of the forward open end thereof (see Fig. 1).

Extending entirely through the support member 6 along the longitudinal median thereof and adjacent the rearward end of said member 6 is an elongated slot or opening 15, and formed integral with or secured to the upper surface of the said member 6 so as to extend upwardly therefrom in spaced parallel relation at opposite sides of the slot or opening 5 are lugs 16 and 17 which may be of the generally triangular shape shown in the drawing. Extending horizontally through a suitable opening formed in the walls of the casing 1 and the lugs 16 and 17 adjacent the apices of the latter, is a headed stud 18 which is retained against displacement, for example, by means of a clevis pin or the like 19.

Pivotally mounted upon the stud 18 intermediate the lugs 16 and 17 is a retaining pawl 20 which extends downwardly entirely through the slot or opening 15 and is constructed and arranged, in one position thereof, to reside forwardly and in the path of the rearward rocket projectile support button 1 in the manner and relation shown in Fig. 3 of the drawing. The retaining pawl 20 is secured in the described position forwardly and in the path of the rearward projectile support button 12 to retain the latter against displacement out of the groove or channel 7 in the forward direction by means of a pin 21 which is inserted through a suitable opening that extends through the casing 1 and support member 6 and is so located that the said pin 21 extends transversely through the slot or opening 15 in engagement with a notch or recess 22 formed in the forward or leading face of the retaining pawl 20 in the manner and relation shown in said Fig. 3.

The pin 21 is constructed to embody a shear strength sufficient to retain the button 12 and rocket projectile 13 carried thereby against displacement forwardly and outwardly of the groove or channel 7 under the concentrated deceleration forces imparted to the airplane in the course of an arrested lading upon the flight deck of an aircraft carrier. On the other hand shear strength of the pin 21 is not sufficiently large to prevent the firing of the rocket projectile when desired, since the very large initial forces generated by the rocket charge exerted through the supporting button 11 upon the retaining pawl 20, are many times in excess of the force necessary to actuate the pawl 20 in a counterclockwise direction and readily shear the retaining pin 21 to thereby release the retaining pawl 20 which is actuated into the dotted line position shown in Fig. 3 and out of the path of the rear supporting button 12 which is left free to travel with the rocket 13 forwardly and outwardly of the groove or channel 7.

When it is desired to mount a rocket projectile 13 in the support or mount herein shown and described, the pin 21, or sheared fragments thereof produced by a previous firing of a rocket projectile, is removed and the retaining pawl 20 is actuated into the dotted line position shown in Fig. 3 of the drawing by means of a suitable actuator 23 which is operatively connected to the trailing face of the said pawl 20 and extends rearwardly therefrom to a point exteriorly of the casing 1. With the retaining pawl 20 disposed in the dotted line position shown in Fig. 3 the support buttons 12 of another rocket projectile may be slidably inserted inwardly of the groove or channel 7 from the forward open end thereof until the rearward button 12 engages the closing rear end wall thereof. The rod 23 then may be actuated to the left with respect to Fig. 3 to position the retaining pawl 20 in front and in the path of the button 12 as shown in solid lines in Fig. 3, after which the retaining pin 21 is inserted through its opening and into engagement with the notch 22 in the forward face of the retaining pawl 20 to secure the latter and the rearward projectile support button 12 against displacement under the deceleration forces imparted thereto by the arrested landing of the plane upon the flight deck of an aircraft carrier. The pin 21 is retained against displacement laterally from the device by means of a cap member 24 which is pivotally mounted upon the casing 1 and adapted normally to overlie the externally disposed head portion of the pin 21.

From the foregoing it will be apparent that the present invention provides a novel support or mount for rocket projectiles at the under side of the wings of an airplane which is constructed and operable to prevent release of the projectiles under deceleration forces imparted to the plane during an arrested landing thereof on the flight deck of an aircraft carrier, and which, at the same time, is constructed and arranged to provide for the ready release of the rocket projectile when fired in the customary manner. The invention also provides a novel device having the features and characteristics set forth which is of relatively simplified and comparatively inexpensive construction and entirely fool-proof and efficient in operation and use.

While a particular embodiment of the present invention has been illustrated and described herein, it is not intended that the invention be limited to such disclosure and changes and modifications may be made therein and thereto within the scope of the claims.

The invention described herein may be manufactured and used by or for the Government of the United States of America for governmental purposes without the payment of any royalties thereon or therefor.

We claim:

1. A device of the character described comprising a structure arranged to be secured in a fore and aft direction beneath an airplane, means providing an elongated channel longitudinally along the underside of said structure to slidably receive and retain therein the supports of a projectile, said channel being open at the forward end and closed at the rearward end thereof, a pawl pivotally carried by said structure and arranged in one position thereof to project into said channel forwardly of a projectile support positioned therein, and a pin carried by said structure and engaging said pawl when in said one position to prevent pivotal movement thereof and lock the projectile support against displacement forwardly outwardly of said channel, said pin having a shear strength sufficient to retain said pawl and projectile support against operational deceleration and acceleration forces acting thereon but insufficient to retain said pawl and support when the projectile is fired.

2. A device of the character described comprising a structure arranged to be secured in a fore and aft direction beneath an airplane, means providing an elongated channel longitudinally along the underside of said structure to slidably receive and retain therein the supports of a projectile, said channel being open at the forward end and closed at the rearward end thereof, a pawl pivotally carried by said structure and arranged in one position thereof to project into said channel forwardly of a projectile support positioned therein, a pin carried by said structure and engaging said pawl when in said one position to prevent pivotal movement thereof and lock the projectile support against displacement forwardly outwardly of said channel, said pin having a shear strength sufficient to retain said pawl and projectile support against operational deceleration and acceleration forces acting thereon but insufficient to retain said pawl and support when the projectile is fired, and means operable when said pin is removed from the structure to actuate said pawl outwardly of the channel to permit the mounting of a projectile support therein.

3. A device of the character described comprising a casing structure arranged to be secured in a fore and aft direction beneath an airplane, a member secured in said casing with its underside exposed in downwardly facing relation with respect to the plane, means providing an elongated trackway longitudinally along the under side of said member to slidably receive and retain therein the supports of a projectile, said trackway being open at the forward end and closed at the rearward end thereof, a pawl pivotally carried by said member and arranged in one position thereof to project into said trackway forwardly of a projectile support positioned therein, and a pin engaging said member and said pawl when in said one position to prevent pivotal movement thereof and lock the projectile support against displacement forwardly outwardly of said trackway said pin having a shear strength sufficient to retain said pawl and projectile support against operation deceleration and acceleration forces acting thereon but insufficient to retain said pawl and support when the projectile is fired.

4. A device of the character described comprising a casing structure arranged to be secured in a fore and aft direction beneath an airplane, a member secured in said casing with its underside exposed in a downwardly facing direction with respect to the plane, means providing an elongated trackway longitudinally along the underside of said member to slidably receive and retain therein the supports of a projectile, said trackway being open at the forward end and closed at the rearward end thereof, a pawl pivotally carried by said member and arranged in one position thereof to project into said trackway forwardly of a projectile support positioned therein, a pin removably carried by said member and engaging said pawl when in said one position to prevent pivotal movement thereof and lock the projectile support against displacement forwardly outwardly of said channel, said pin having a shear strength sufficient to retain said pawl and projectile support against operational deceleration and acceleration forces acting thereon but insufficient to retain said pawl and support when the projectile is fired, and means operable when said pin is removed from engagement with said pawl to actuate the same outwardly of the channel to permit the mounting of a projectile support therein.

ROBERT M. ELDER.
JOHN J. DOMOJ.
EDWARD W. WISE.
JOHN J. KONIKOFF.

REFERENCES CITED

The following references are of record in the file of this patent:

FOREIGN PATENTS

| Number | Country | Date |
|---|---|---|
| 316,200 | Germany | Nov. 22, 1919 |

OTHER REFERENCES

The British rocket plane disclosure appearing in the Richmond Times-Dispatch for May 31, 1944. (A copy of this disclosure can be found in Div. 22 of the Patent Office in Class 89, subclass 1.7.)